April 8, 1947.  R. P. LEWIS  2,418,515
METHOD AND APPARATUS FOR MEASURING AND MANUFACTURING VENETIAN BLINDS
Filed Dec. 8, 1944  3 Sheets-Sheet 3
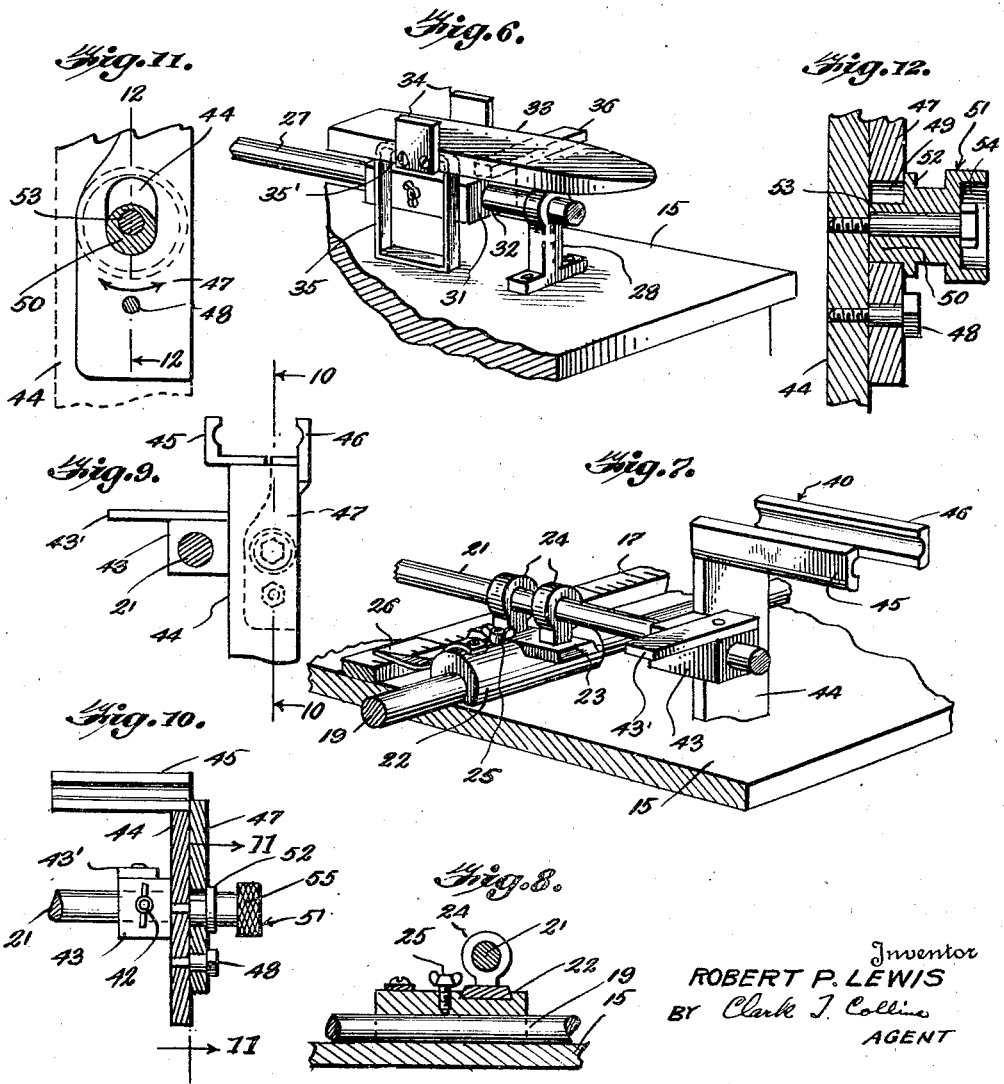
Inventor
ROBERT P. LEWIS
BY Clark J. Collins
AGENT Patented Apr. 8, 1947

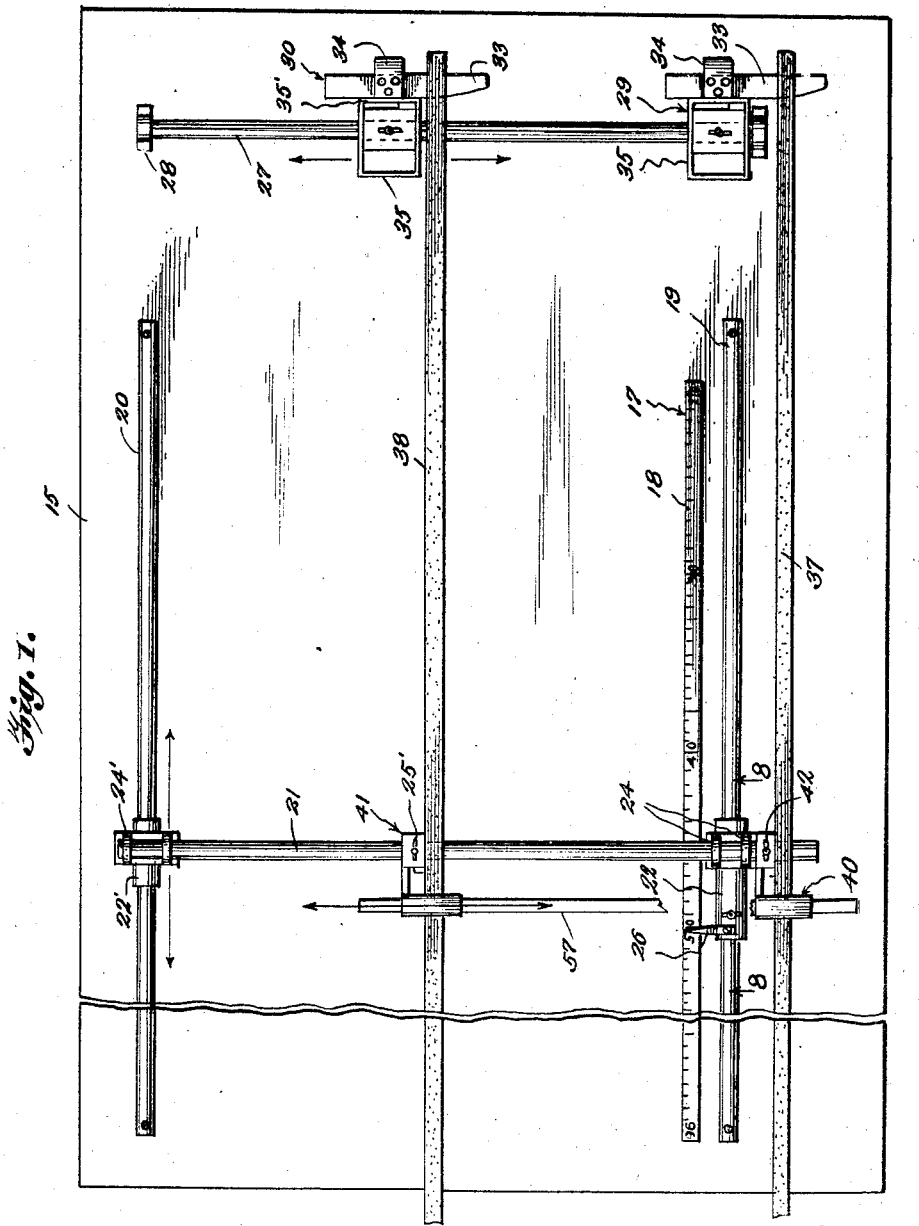

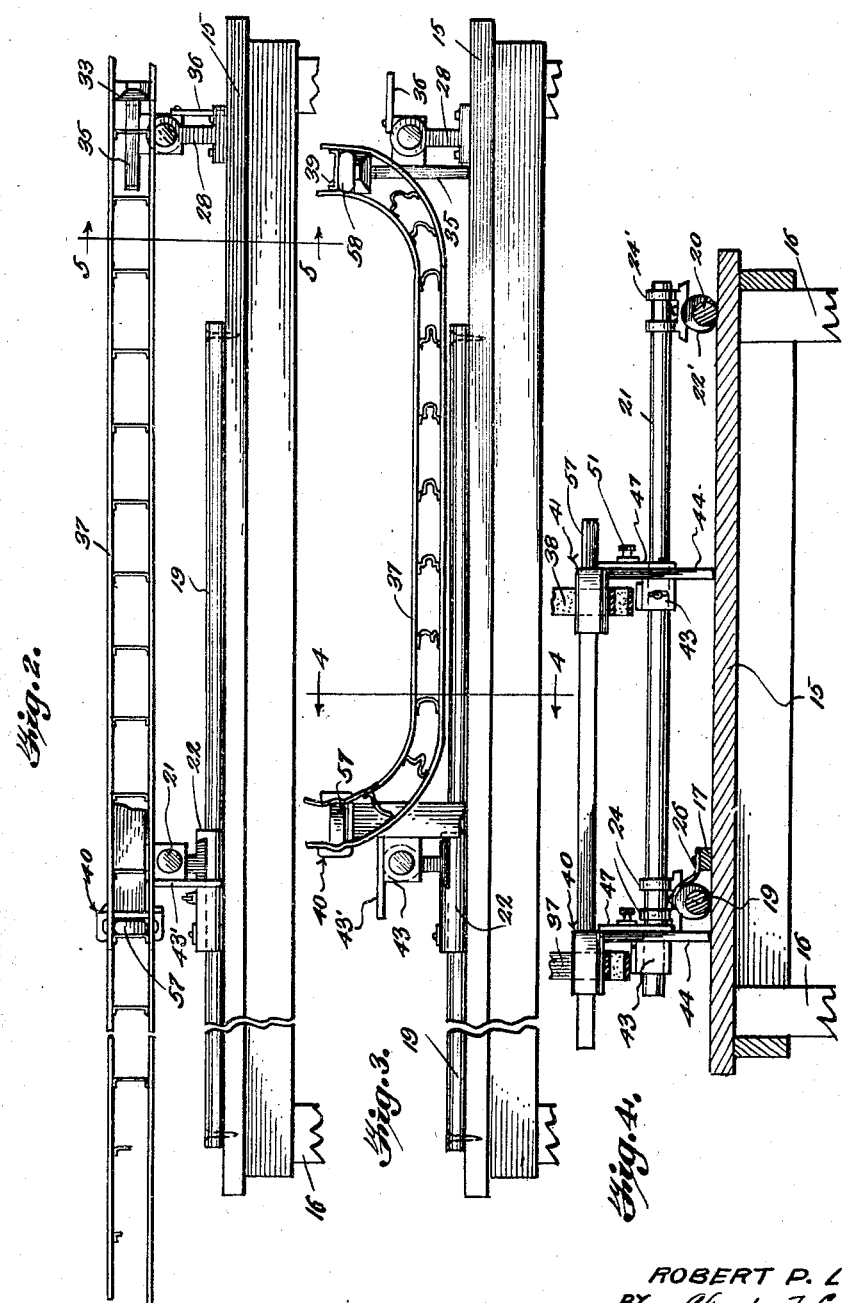

2,418,515

UNITED STATES PATENT OFFICE 2,418,515

METHOD AND APPARATUS FOR MEASURING AND MANUFACTURING VENETIAN BLINDS

Robert P. Lewis, Waco, Tex., assignor to Clark T. Collins, Waco, Tex.

Application December 8, 1944, Serial No. 567,308

8 Claims. (Cl. 160—405)

The present invention relates to apparatus and method for use in the manufacture of Venetian blinds.

An important object of the invention is to provide an apparatus which will afford accurate gauging of the length of the tape ladders for various sizes of Venetian blinds and which, after the tape ladders are measured and cut to the desired length, will provide means for the attachment thereof to the top and bottom cross bars or rails of the Venetian blind.

Another object of the invention is to provide a facile method for measuring and attaching the tape ladders along both sides of the Venetian blind in substantially one operation.

A further object of the invention is to provide novel means for supporting the top and bottom cross bars of a Venetian blind so that the measured tape ladders can be attached thereto with a minimum amount of effort and time.

Other objects and advantages of the invention will be apparent during the course of the following description.

In the accompanying drawings which form a part of this specification, and wherein like reference characters designate like parts throughout the several views, Figure 1 is a top plan view of the apparatus embodying the present invention, the same being illustrated as attached to the top of a table;

Figure 2 is a side elevational view thereof;

Figure 3 is a view similar to Figure 2 with parts in position for attaching the tape ladders to the top and bottom cross bars of a Venetian blind;

Figure 4 is a vertical sectional view taken substantially on line 4—4 of Figure 3;

Figure 5 is a vertical sectional view taken substantially on line 5—5 of Figure 2;

Figure 6 is a fragmentary perspective view of one end of the device which supports the tape ladders for measurement;

Figure 7 is a fragmentary perspective view of one of the arms which supports the top bar of the Venetian blind;

Figure 8 is a fragmentary sectional view taken substantially on line 8—8 of Figure 1;

Figure 9 is an end elevational view of the supporting arm shown in Figure 7;

Figure 10 is a sectional view taken substantially on line 10—10 of Figure 9;

Figure 11 is a sectional view taken substantially on line 11—11 of Figure 10; and Figure 12 is a sectional view taken substantially on line 12—12 of Figure 11.

Referring to the drawings, the reference numeral 15 designates the top of a table on which is mounted the apparatus embodying the features of the present invention. The table top 15 is supported on legs 16 as illustrated in Figure 5, but as is to be understood, any means other than a table can be provided for supporting the apparatus within the meaning of the present invention.

A rule or scale 17 having graduations 18 thereon is suitably secured to the table top 15, said rule extending longitudinally of the table and being spaced from one longitudinal edge thereof, as shown in Figure 1 of the drawings. Also fixedly secured to the table top 15 and extending longitudinally thereof in substantial parallelism with the rule 17 is a rod 19, and a complementary rod 20 on the side of the table opposite the rule 17. The rods 19 and 20 form a support for the transverse rod 21 which is slidable along these rods and longitudinally of the table for a purpose to be hereinafter described.

The means for slidably supporting the rod 21 on the rod 19 is best shown in Figure 7, and includes a C-shaped clamp 22 forming a support for the transversely disposed block 23 from which projects a pair of spaced bearing members 24 within which the rod 21 is rotatable. A similar device comprising bearings 24' and a sleeve 22' slidably supports the other end of rod 21 upon the rod 20. The block 23 is fixedly held within the clamp 22 and the latter is held against sliding movement relative to the rod 19 by means of the manually operable set screw 25. When desiring to move the clamp 22 in the directions of the arrows shown in Figure 7, the set screw 25 is withdrawn from contact with the rod 19, whereupon the clamp 22 and its associated mechanism can be readily moved to the desired position. Also carried by the clamp 22 is a needle pointer or indicator 26 which overlies and cooperates with the rule 17. The clamp 22 is adjustable in inches as designated by the pointer 26 on the scale 17 to the desired length of the Venetian blind with which the tape ladder is to be used.

A second transverse rod 27 is supported in spaced standards 28 which are in turn fastened adjacent one end of the table top 15, said rod being disposed substantially parallel to the rod 21. The rod 27 carries a pair of tape ladder holding and bar supporting members 29 and 30, the member 29 being held against axial movement on the rod 27 but capable of rotary movement relative thereto, while the member 30 is axially movable and rotatable. The members 29 and 30 are identical in construction and for a clear illustration of one of them, attention is directed to Figure 6 of the drawings. It will be noted that each member includes a rectangular-shaped block 31 having a central bore 32 for the reception of the rod 27. Welded or otherwise secured to one face of the block 31 is a rectangular-shaped frame 35 adapted to contact the table top 15 when in the position shown in Figures 3 and 6. An arm 33, preferably constructed of wood, is bolted or otherwise secured to one end 35' of the frame 35 and a pair of spring fingers 34 are mounted on opposite sides of the arm 33, said fingers adapted to support therebetween the base bar 58 of a Venetian blind (Figure 3).

Another face of the block 31 has attached thereto a leg member 36 adapted to contact the table when the member 29 or 30 is swung 90° from the position shown in Figures 3 and 6 to that seen in Figures 1, 2 and 5. The members 29 and 30 are adapted to be rotated 90° on the rod 27 and in one position the frames 35 form a support for the arms and in the other position the leg members 36 form a support for the arms. As before indicated, the member 30 is axially slidable on the rod 27 in the directions of the arrows shown in Figure 1 to allow for the desired width of the Venetian blind.

The two arms 33 form, when disposed as in Figures 1, 2 and 5, anchorage for one end of the Venetian blind tape ladder when measuring for length and cutting, and are rotated 90° after the cutting operation so as to provide a horizontal support for the base bar of the Venetian blind which is to be positioned between the pairs of fingers 34.

In the drawings, the tape ladders are designated by the reference numerals 37 and 38 and said tape ladders are held on the arms 33 by means of the cross tapes 39. As is well known, a Venetian blind is provided adjacent each side thereof with a tape ladder and the individual slats of the blind are supported by means of the cross tape members or rungs of the ladder. In the use of the present invention, a tape ladder for one side of the blind extends from one of the arms 33 and a tape ladder for the other side of the blind extends from the other arm 33.

The rod 21 carries a pair of members 40 and 41 which are somewhat complemental to the members 29 and 30 in that they are adapted to support one of the cross bars of the blind in a manner to permit tacking of the tape ladders thereto after they have been measured and cut. The member 40 is fixedly held on the rod 21 by means of a screw or the like 42, while the member 41 is slidable transversely of the table top along the rod 21, to which it may be locked by a manually operable set screw 25'. In all other respects the members 40 and 41 are identical in construction and hence only one member will be described in detail.

For a clear illustration of these members, attention is directed to Figures 7, 9, 10, 11 and 12, wherein it will be noted that there is provided a bearing block 43 mounted on the rod 21 to which is attached by any desired means an upright member 44. The member 44 carries one jaw 45 of a clamp, the other jaw 46 being carried by a second upright member 47. The members 44 and 47 are held in assembled relation by means of a bolt 48. However, means are provided for pivoting the member 47 on the bolt 48 so as to adjust the jaws 45 and 46 for purposes to be described. In order to permit this pivotal movement, the member 47 is formed with an elongated opening 49 in which is positioned the eccentric cam 50 of a rotary actuator 51, said actuator being formed with an annular flange 52 which overlies and completely conceals said opening 49. The actuator 51 is rotatably held in the opening 49 by means of a bolt 53, the inner end of said bolt extending through the member 44 while the outer end thereof is confined within the annular recess 54 of the actuator. The actuator 51 is knurled as indicated at 55 to facilitate rotation thereof about the bolt 53 for effecting movement of the jaw 46 toward or away from the jaw 45 due to contact of the eccentric cam 50 with the walls of the opening 49.

Like the arms 33, the units 40 and 41 are swingable to two different positions of rest upon the table. In one position, as in Figures 3 and 7, the lower ends of the uprights 44 engage the table. Each block 43 has welded or otherwise secured thereto a leg 43' designed to abut the table top when the unit has been swung 90° in a counterclockwise direction to attain the position illustrated in Figures 1 and 2. If the set screw 25' is tight, both units, which then are secured to the rotatable rod 21, can be swung simultaneously simply by oscillating only one of them.

In the operation of the device, the rod 21 is first moved longitudinally on the rods 19 and 20 until the pointer 26 has been brought to a position on the rule 17 which will indicate the length of the window opening to which the blind is to be applied. The rod 21 is then locked on the rod 19 by tightening the set screw 25. The members 41 and 30 are next adjusted on their respective rods 21 and 27 to the desired width of the blind. The top bar or cross rail 57 is placed in the clamps 40, 41 and this assembly is swung to the position of Figures 1 and 2, so that the bar is edgewise to the table top. The arms 33 are swung to the position shown in Figures 1 and 2, and the tape ladders 37 and 38 are then slipped over the tapered ends of the wooden arms 33, and it will be noted that the tape ladders are held upon said arms by means of the last cross member 39. Each tape ladder is stretched taut and is slipped over the ends of the top bar 57, whereupon the knobs 51 are adjusted to open the clamp jaws 45, 46 enough to permit the tape ladders to enter the gaps between the jaws. The knobs are then retightened, thus imparting a taut stretch to the tape ladders.

The tape ladders then are cut, as indicated, on lines located within the transverse vertical plane in which the pointer 26 is situated, thus allowing sufficient excess tape ladder material to be folded and tacked to the top cross bar. Before tacking, the clamps are swung to the position of Figure 3, so as to relax the tape ladders and to present the broad flat face of the bar upwardly for convenient application of the tacks.

Next, the arms 33 are swung upwardly until the frames 35 engage the table top. This increases the tape ladder slack to permit facile insertion of the bottom cross bar 58 at this time and also disposes the bar for convenient tacking. The bottom bar is slipped into the last set of loops or cross members and is held by the fingers 34 during the tacking operation. Of course, it will be perceived that, after the tape ladder cutting operation, either tacking operation might be performed ahead of the other or, for that matter, that the sets of clamps and arms might both be swung to their positions shown in Figure 3 before performing the folding and tacking operations. It should further be understood that, although preferable, it is not essential to have both the clamps and the arms rotatable, as a fairy adequate amount of tape ladder slack is obtainable with one set or the other stationary. However, stretching and tacking is facilitated by affording two positions for each set.

After the folding and tacking operations, the bars with the tape ladders attached thereto are removed from the table and the blind is completed by insertion of the slats, etc. The completed blind will be slightly shorter than its window opening, as is desired, due to location of the pointer 26 to the left of the clamps.

From the foregoing description when taken in connection with the accompanying drawings, it will be apparent that there has been provided an apparatus and method for accurately measuring the length of tape ladders for a Venetian blind of any desired size, together with means for supporting the framework of the blind, comprising the top and bottom cross bars. The construction of the device permits fastening of the tape ladders to the top and bottom bars whereby upon removal, the framework has been measured and assembled and is ready for the final operation, namely, the insertion of the slats, etc.

I claim:

1. A method of facilitating the manufacture of Venetian blinds, which consists in anchoring the ends of a pair of parallel tape ladders in transverse alignment, inserting a cross bar through said tape ladders at measured distances from the points of anchorage, cutting the tape ladders adjacent said bar while the tape ladders are taut to afford tape ladder extensions that can be folded against said bar, producing slackness in the tape ladders, and then folding said extensions and securing them to said bar.

2. In an apparatus of the character described, an elongated supporting structure equipped with means having a longitudinal series of measuring indicia, a device connected to said structure and slidable longitudinally adjacent said measuring indicia for visual cooperation therewith, a second device connected to one end of said structure and adapted to engage a Venetian blind tape ladder that is to be measured and cut, at least one of said devices being shiftable longitudinally of said structure into two positions of adjustment relative to the other device, and said devices carrying means for engaging, respectively, two Venetian blind cross bars to which the tape ladder is to be attached.

3. The apparatus defined in claim 2, wherein both of said devices are pivotally mounted on axes extending transversely of said elongated structure.

4. The apparatus defined in claim 2, wherein each device comprises a pair of tape ladder engaging elements that are adjustable relative to each other laterally of said structure.

5. In an apparatus of the character described, a supporting structure, a member extending longitudinally of said structure, a graduated scale associated with said structure and disposed adjacent and substantially parallel to said longitudinal member, a transverse member slidable on said longitudinal member, a second transverse member disposed substantially parallel to said first transverse member, means on said second transverse member for receiving one end of a tape ladder to be cut, and means associated with said longitudinal member and movable over said scale for gauging the length of the tape ladder as it is stretched from said second transverse member toward said first transverse member.

6. In an apparatus of the character described, a supporting structure, a transverse rod fixedly secured to one end of said structure, a member extending longitudinally along one side of said structure, a second transverse rod slidable on said longitudinal member and positioned in spaced parallel relation to said first transverse rod, a graduated scale associated with said structure and disposed adjacent and substantially parallel to said longitudinal member, and means rotatable on said first transverse rod for holding one end of a tape ladder as it is extended to said second transverse rod and gauged by said graduated scale for cutting.

7. In an apparatus of the character described, a supporting structure, a transverse rod fixedly secured to one end of said structure, a member extending longitudinally along one side of said structure, a second transverse rod slidable on said longitudinal member and positioned in spaced parallel relation to said first transverse rod, a graduated scale associated with said structure and disposed adjacent and substantially parallel to said longitudinal member, means on said second transverse rod for supporting one of the cross bars of a Venetian blind, and means rotatable on said first transverse rod for supporting the other cross bar in one position and in another position for receiving one end of a tape ladder as it is stretched toward said second transverse rod to be gauged by said graduated scale.

8. In an apparatus of the character described, a supporting structure, a transverse rod fixedly secured to one end of said structure, a member extending longitudinally along one side of said structure, a second transverse rod slidable on said longitudinal member and positioned in spaced parallel relation to said first transverse rod, a graduated scale associated with said structure and disposed adjacent and substantially parallel to said longitudinal member, a clamp fixedly secured to one end of said second transverse rod, a second clamp on said second transverse rod and movable axially thereof, said clamps adapted to support one of the cross bars of a Venetian blind, and means rotatable on said first transverse rod for supporting the other cross bar, said second transverse rod being slidable on said longitudinal member and gauged by said scale to the desired length of the Venetian blind being manufactured.

ROBERT P. LEWIS.

REFERENCES CITED

The following references are of record in the file of this patent:

UNITED STATES PATENTS

| Number | Name | Date |
|---|---|---|
| 2,031,981 | Runge | Feb. 25, 1936 |